United States Patent [19]
Payne

[11] Patent Number: 5,168,200
[45] Date of Patent: Dec. 1, 1992

[54] AUTOMATIC POWERED FLOWMETER VALVES AND CONTROL THEREOF

[76] Inventor: Kenneth R. Payne, W148 N8252 Albert Pl., Menomonee Falls, Wis. 53052

[21] Appl. No.: 784,654

[22] Filed: Oct. 28, 1991

Related U.S. Application Data

[63] Continuation of Ser. No. 452,232, Dec. 18, 1989, abandoned.

[51] Int. Cl.⁵ .............................................. H02P 7/00
[52] U.S. Cl. ................................. 318/282; 251/129.11
[58] Field of Search .......................... 318/280–286, 318/366–374, 466–469, 644, 645, 486, 483, 256, 54, 65; 73/861.55, 325; 251/128, 129.03, 129.04, 129.11, 129.12, 129.15, 162, 181, 184, 284, 225, 333, 339

[56] References Cited

U.S. PATENT DOCUMENTS

| | | | |
|---|---|---|---|
| 1,985,539 | 12/1934 | Hartwig | 318/644 X |
| 2,140,486 | 12/1938 | Turner | 318/644 X |
| 2,348,104 | 5/1944 | Beddoes | 158/99 |
| 2,932,319 | 4/1960 | Reinecke | 318/282 X |
| 3,015,768 | 1/1962 | Hornfeck et al. | 318/645 |
| 3,055,389 | 9/1962 | Brunner | 318/644 X |
| 3,561,895 | 2/1971 | Michelson | 431/11 |
| 3,602,487 | 8/1971 | Johnson | 263/19 |
| 3,616,884 | 11/1971 | Jurge | 318/468 X |
| 3,684,423 | 8/1972 | Bryant | 431/24 |
| 3,712,582 | 1/1973 | Moesta | 318/369 X |
| 3,722,811 | 3/1973 | Osburn | 236/14 |
| 3,734,675 | 5/1973 | Osburn | 431/12 |
| 3,816,901 | 6/1974 | Camacho et al. | 29/426 |
| 3,905,394 | 9/1975 | Jerde | 137/599 |
| 4,035,203 | 7/1977 | L'Hermite et al. | 148/16.5 |
| 4,111,637 | 9/1978 | Hillman, II | 431/12 |
| 4,279,406 | 7/1981 | Bourhis et al. | 266/81 |
| 4,322,255 | 3/1982 | Kostelitz | 148/16.5 |
| 4,348,169 | 9/1982 | Swithenbank et al. | 431/89 |
| 4,364,111 | 12/1982 | Jocz | 318/286 X |
| 4,440,028 | 4/1984 | Ramlow | 73/861.55 |
| 4,445,075 | 4/1984 | Fry | 318/282 X |
| 4,445,945 | 5/1984 | Schwalm | 148/16 |
| 4,632,707 | 12/1986 | Shay et al. | 148/16.5 |
| 4,744,839 | 5/1988 | Queille | 148/16.5 |
| 4,774,676 | 9/1988 | Stenzel et al. | 364/510 |

Primary Examiner—A. Jonathan Wysocki
Attorney, Agent, or Firm—Andrus, Sceales, Starke & Sawall

[57] ABSTRACT

A motorized valve and controller is mounted to a flowmeter having a sensor creating a flow-related signal. A tapered valve stem linearly moves through a round sharp-edge opening in an orifice plate. The stem is longer than the opening. A stepping motor has a linearly moving shaft connected to the valve stem. The shaft is manually movable and may be fixed against rotation for positioning. The stem and orifice plate are replaceable. The controller controls the motor and provides compensation for non-linearity in flow rate. A relatively constant stem force closes the valve totally with a small seating force and a relative low breakaway force. The controller includes multiboard circuit, and provides for manual control. A differential in the level of sensed and demand signals varies the motor opened. Limit signals or a lost of signal enables the manual control. A control panel includes an auto/manual switch, a manual control switch and lamps which indicate the state of the valve control and malfunction thereof.

28 Claims, 5 Drawing Sheets

FIG. 4B

AUTOMATIC POWERED FLOWMETER VALVES AND CONTROL THEREOF

This application is a continuation of Ser. No. 07/452,232, filed Dec. 18, 1989 now abandoned.

BACKGROUND OF THE INVENTION

This application relates to a powered flowmeter valve and particularly to an automated powered flowmeter valve control for monitoring and controlling the flow of fluids.

Fluid control systems are widely used to supply a particular fluid to a load device. With various applications and processes, close and accurate control of the fluid flow is required. Further, if the fluid flow deviates in any significant manner, resetting response must be rapid in many applications. A typical example of systems requiring accurate metering of gases exists in gas fired combustion units, particularly for metal hardening furnaces. In such units, gases are often mixed and supplied to generate a suitable hardening atmosphere. Nitrogen and methanol are widely used with present day hardening furnaces. Controlled mixing of the gases and introduction into the furnace in an accurately controlled ratio is required for safe and efficient operation. If for any reason the gas mixture deviates from a predetermined level, the system should be shut down by closure of an appropriate valve. The actual flow of the gases such as nitrogen may vary with various environmental conditions. The control unit should provide a rapid response to reset the respective gas flows and the like. The assignee of this application has a long history of supplying high quality flowmeters for accurately monitoring and controlling the flow of gas and other fluids to a high degree of accuracy. U.S. Patents issued to the assignee which disclose typical flowmeters having an automated control signal and a visual readout of the status of the flow condition include U.S. Pat. No. 4,774,676 which issued Sep. 27, 1988 and U.S. Pat. No. 4,864,870 which issued Sep. 12, 1989. Other flowmeter devices are available and disclosed in prior art such as disclosed in the above patents.

Although prior art systems have been used heretofore and recognized as providing satisfactory performance in various applications, there is a need for an improved system for accurate and rapid readjustment of a flow control valve coupled to a metered flow system to accurately hold the flow within close parameters, as well as permitting shutdown in limit positions indicative of an abnormal flow and a malfunction or failure within the metering system.

SUMMARY OF THE PRESENT INVENTION

The present invention is particularly directed to a motorized valve unit and a controller that is readily adapted to existing flowmeters having an appropriate sensor creating an output signal related to actual flow and in particular such a motorized valve and controller which creates a rapid response, close set point accuracy and various safety features. Generally, a flow valve unit is mounted as a part of a flowmeter and includes a movable valve member coupled to a reversible drive motor for setting of the flow in accordance with the output of a meter position signal or other source. In accordance with the present invention, the flow valve unit includes a valve body having an orifice plate assembly with a cylindrical flow orifice. A tapered valve stem is mounted for linear movement through the orifice and establishes a precisely regulated flow rate by varying of the axial position of the stem in relationship to the valve orifice, and particularly the flow edge. In accordance with one aspect of the present invention a stepping motor or other similar precise powered positioning unit is provided for accurately positioning the valve stem within the orifice. The assembly provides an accurate metering of the flow in accordance with the setting of the valve stem. In a preferred construction, particularly adapted to manual control as well as fully automated control, the stepping motor is provided with a manual adjustment for manually adjusting the setting of the valve stem. An interlock is provided between the support for the motor and the adjustable member for locking of the motor shaft against rotation while permitting the linear movement of the motor shaft. The valve stem is directly coupled to the shaft of the stepping motor such that each step of the motor provides a small incremental linear movement of the valve stem, and generally providing movement on the order of one thousandth of an inch per pulsed step of the motor. The motor is connected to a suitable control unit which preferably includes an electronic controller located within the housing and having a programmed input in combination with a feedback from the flow sensing unit.

The tapered valve structure is particularly adapted to controlling higher pressure fluid flows. The taper does, however, introduce some non-linearity into the valve system which varies somewhat with the flow. However, with the precise control provided, the system is readily programmed to provide the desired flow control. Generally at low flow the linearity of the device is substantial. However, as flow increases and at full flow, a significant difference in linearity may exist. Compensation is readily provided within a control program to vary the steps of the stepping motor for each particular variation in flow sensed. In accordance with a particular feature of this invention, the tapered valve member is formed with a length substantially greater than the length of the orifice. The same basic structure can thus be adapted for use in different flow ratings by proper positioning of the valve stem relative to the range orifice.

The present invention with the large tapered valve unit prevents jamming of the valve unit in the closed position. With the linear movement of the stem relative to the orifice, a relatively constant force arrangement is established. In a preferred construction, the valve stem unit includes a valve stem piston or body portion mounted in a bore of the valve body. An encircling resilient frictional seal is located between the valve stem body to produce a minimum sealing force. This establishes a maximum force relationship for moving the tapered stem and rapid response at all settings of the valve stem. With the linear movement of the valve stem, the valve can be moved to the total closed position with a small seating force thereby establishing a total seal of the flow without the usual high force seating of the valve unit. As a result, a relative low breakaway force is required in opening the valve without damage to the valve structure.

More particularly in a preferred and practical construction, a motorized valve controller is adapted to a standard flowmeter manufactured and sold by Waukee Engineering Company, Inc. such as disclosed in the above-identified U.S. Patents. The output of the flow sensor is a low current signal which is used as one input to the controller to provide an output directly indicative of the necessary position of the valve. A controller housing is mounted to the elongated tubular flowmeter at one flow line connector. A valve unit includes a valve body having an axial passageway and a lateral passageway coupled to the flow line connector of the meter. The inner end of the valve body includes a valve plate having a orifice related to the desired flow range. The valve plate is preferably formed as a separate item which is secured to the inner end of the valve body to permit custom designing of the valve for different flow ranges. A central bore of the valve body is aligned with the orifice plate. A valve stem unit includes a stem body member slidably secured within the bore. The body is formed with a sliding fit within the bore in combination with an encircling friction seal. The seal is preferably a generally U-shaped cup seal opening toward the flow passageway. Any leakage along the bore is into the valve cup and tends to seal the valve cup against the side wall with an essentially constant frictional force. The tapered valve stem projects inwardly from the stem body into precise alignment and projection through the orifice, and thereby provides an accurate edge opening between the adjacent edge of the orifice. The taper in the orifice and the stem provides a gradual but small enlargement of the flow passageway directly related to the axial and linear positioning of the valve body and stem. The motor is mounted to the base plate to which the valve body is secured. The stepping motor is mounted within the housing in precise alignment with the valve body and valve stem, and coupled through a rotary to linear motion coupler to a driven shaft, with the motor driven shaft extended through the motor and with the inner end formed as a smooth shaft member fixed to the valve body as by a set screw or the like. The outer end of the shaft is provided with an adjustment knob or wheel which is fixed to the outer end of the motor driven shaft. The wheel provides for the manual adjustment of the motor shaft and the attached valve stem to an initial position with the motor de-energized. The wheel also provides for manual adjustment of the flow opening under emergency conditions. In addition, the motor may be provided with a brake unit, and conveniently a dynamic braking circuit, to prevent rotation of rotary to linear motion device such that the turning of the wheel and attached shaft insures linear positioning of the valve stem structure. The motor shaft and wheel are located within the lower portion of the housing. An outer door structure or cover permits access to the motor and the adjustment wheel. An interlock between the cover and the wheel is provided to lock the rotational position of the shaft in the preset position. The interlock unit permits the linear movement of the shaft but prevents the rotation of the wheel and shaft, thereby providing for the necessary linear positioning of the shaft and the interconnected valve stem.

The housing is adapted to fit downwardly over the motor construction and includes an appropriate circuit board and control devices within the upper portion of the housing for interconnection to the motor and through a cable connection to the input power and control signals. Various external controls are mounted to an upper panel on the control housing and include a selection switch unit for manual or automated control, manual controls for appropriately moving the valve unit in the manual position as well as various indicators such as switch positions, limit lamps, loss of flow lamps and the like.

In the manual control position, a manual switch control provides for energizing the motor for either upward or downward movement of the valve stem to respectively increase and reduce the flow rate. The actual flow rate, of course, can be readily read out on a suitable data display or by viewing the meter unit.

The output of the meter also provides a precise indication of the flow rate with the meter and the sensor functioning properly. In a preferred construction of the system, if the rate of flow moves beyond a low or high limit, a corresponding signal is generated. The system is preferably constructed to respond to a significant drop below the lower limit, indicating some more serious failure in the gas supply. In one embodiment, the latter state is indicated by the simultaneous energization of both the high and the low limit indicators. A failure in the flowmeter signal is indicated by simultaneous energization of the manual indicator and the auto indicator. Other controls can, of course, be readily provided and incorporated into the system if so desired.

The present invention has been found to provide a highly improved motorized valve and valve control for controlling gas flows with accurate valve positioning and accurately establishing flow over a relatively significant pressure and flow ranges. The valve structure can be precisely and accurately formed with present day machining techniques. The system using low voltage driven stepping motors, conventional solid state technology and the like provides a practical commercial construction of the system for use in severe environments.

BRIEF DESCRIPTION OF DRAWINGS

The drawings furnished herewith generally illustrate a best mode as presently contemplated for carrying out the invention and as described hereinafter.

In the drawing,

FIG. 3 is an exploded view of the valve unit shown in FIGS. 1 and 2;

FIG. 3a is an enlarged fragmentary view of the flow valve unit shown in FIGS. 2 and 3; and FIGS. 4A, 4B and 4C illustrate a schematic control circuit for the illustrated embodiment, with FIG. 4A a motor drive circuit board and FIG. 4B a controlled circuit board.

DESCRIPTION OF ILLUSTRATED EMBODIMENT

Figure 1:
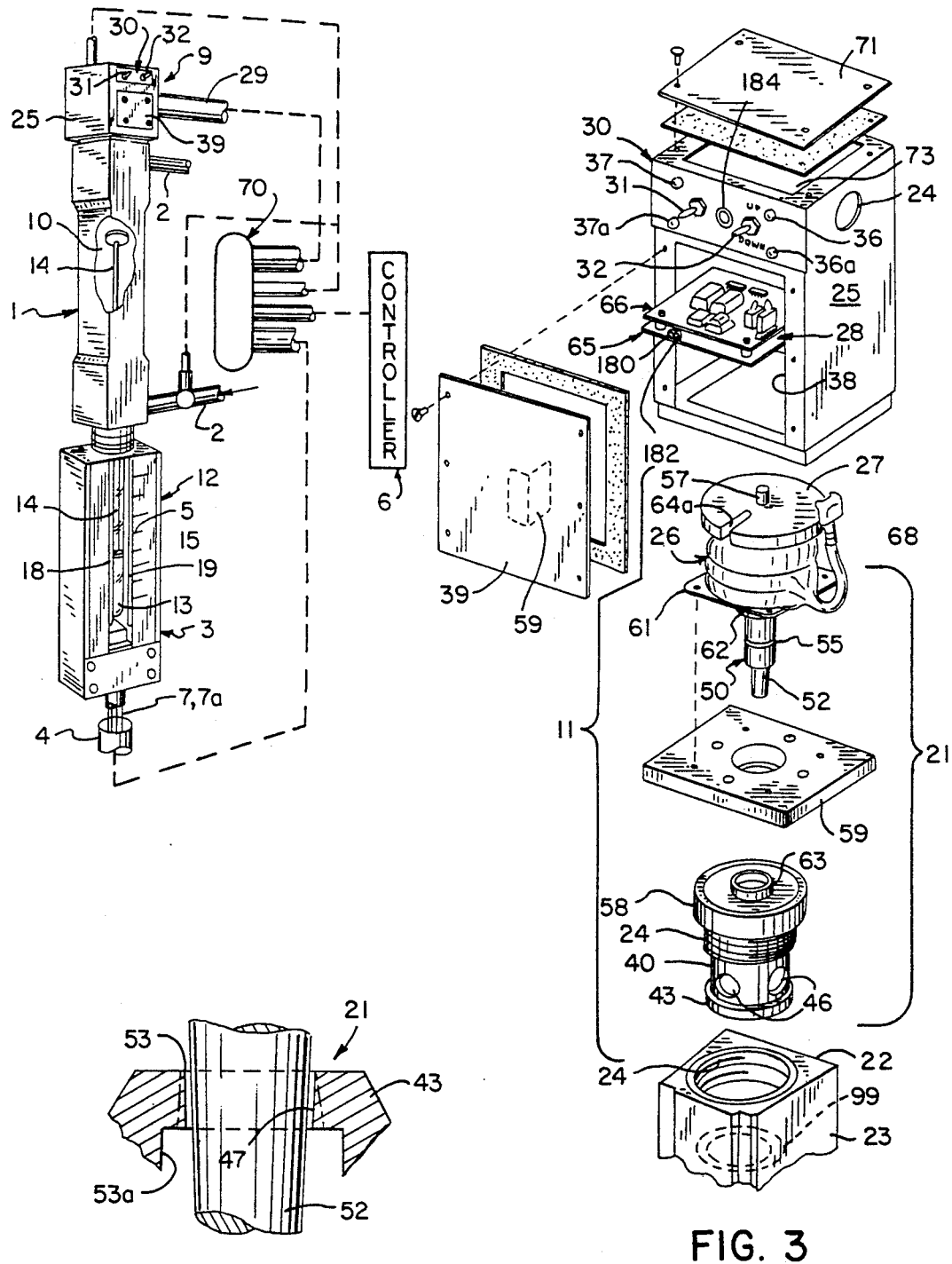
FIG. 1 is a diagramatic illustration of a flowmetering system incorporating a controlled flowmeter incorporating a programmed motorized valve unit constructed in accordance with the teaching of the present invention and illustrating an embodiment of the invention.

Referring to the drawings and particularly to FIG. 1, a flowmeter 1 is illustrated connected in a flow line 2 for measuring the flow rate of a gas or other fluid flowing through the flow line. Tyically, the present invention has been applied in metering of gas flows for hardening furnaces and the like. Separate flowmeters such as illustrated are, for example, connected to establish predetermined flow rates of nitrogen and of methanol to a mixing chamber and therefrom to the furnace and creating a suitable atmosphere for hardening within the furnace. The flowmeter 1 however may readily be adapted to the monitoring of liquid as well as gaseous mediums. Generally, the flowmeter 1 incorporates a related sensor unit 3 mounted to the lower end of the flowmeter. The sensor unit 3 is preferably constructed in accordance with the teaching and disclosure of previously identified U.S. Pat. No. 4,864,870. Generally, the sensor unit 3 generates an analog signal at a coupling cable 4 as well as providing a direct visual output reading on a scale unit 5 mounted to the front of the sensor unit 3. The cable 4 is also provided with a DC supply for operating of an optical sensing system mounted within the sensor unit 3. The output signal is an electrical analog signal which is compared to a command signal from a control unit 6 such as a programmer for producing a programmed flow, as more fully described hereinafter a control of a motor driven controller mounted to the opposite end of the flowmeter 1. Thus as more fully disclosed in the previously identified application, the cable 4 includes signal lines 7 and 7a which are connected in an appropriate manner to the programmer or controller unit 6, a data logger, not shown, and a flow control unit 9 secured to the top of flowmeter 1 for controlling of the flow in flow line 2.

Figures 2, 5:
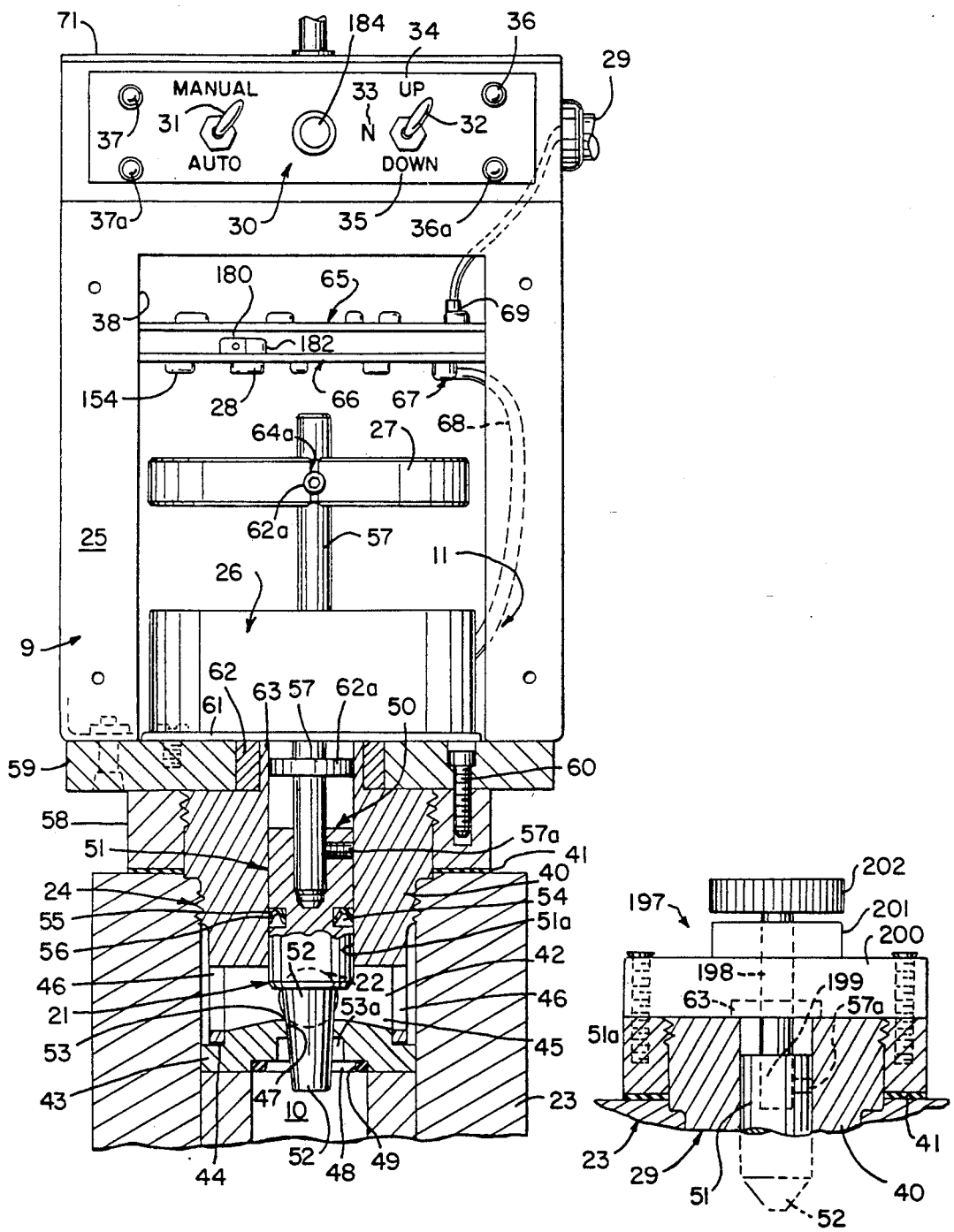
FIG. 2 is an enlarged vertical section of the motorized valve unit shown in FIG. 1.
FIG. 5 illustrates a further modification to the system shown in FIGS. 1-4c.

The basic structure of the flowmeter 1 is more fully disclosed in U.S. Pat. No. 4,440,028 which issued Apr. 3, 1984 to Ralph W. Ramlow and is assigned to the assignee of the present invention. Generally, as shown in FIGS. 1-3, flowmeter 1 includes the flow line 2 connected to the opposite ends of a flow passageway 10. The control unit 9 includes a motorized valve unit 11 within the upper connection of the meter flow passageway 10 to control the flow therethrough and thereby the flow rate.

The illustrated sensor unit 3 includes a outer housing 12 with a tube 13 aligned with and coupled to the flowmeter 1. A float rod 14 is mounted within a suitable oil filling the tube 13, and the upper end is located within the meter flow passageway 10 and thereby coupled to the flowing gas being metered in flowmeter 1. A disc indicator 15 secured to the lower end of rod 14 and establishes a visual readout with respect to the readout scale 5 provided on the front of the sensor unit 3. As more fully developed in the above-entitled application an LED light bar 18 is secured within one side of the sensor housing 12 and a phototransistor bar 19 is secured to the opposite side of the housing 12. The LED light bar 18 establishes a continuous bar or beam of light which is transmitted through the tube 12. The float rod 14 functions to interrupt the light and controls the energization of the phototransistor bar 19. The output is provided as an accurate analog current signal, directly proportional to the position of the indicating disk and the float rod 14 within the tube and thereby in accordance with the actual flow rate through the flowmeter. Typically, the output current may vary between 4 and 20 milliamps for full scale movement of the sensor disc 15. The signal is transmitted as an isolated signal via signal lines 7 and 7a.

The present invention can, of course, be incorporated into any flowmeter establishing an appropriate electrical or signal convertible to an electrical signal for connection into a control for driving of motorized valve unit 11, which is particularly constructed in accordance with the teaching of the present invention.

Referring particularly to FIGS. 1-3, the illustrated motorized valve unit 11 includes a flow control valve 21 mounted within the upper end of the flowmeter. The valve 21 is located between the axial flow passageway 10 through the meter 1 and the flow line connector 22 of the flowmeter.

More particularly, the flowmeter includes an elongated housing or body 23 with the axial passageway 10 therethrough. An inlet gas line 2 is connected at one end of the housing 23 and the outlet gas line 2 connected at the opposite and upper end of housing 23 as illustrated in FIGS. 1-3. The upper end of the meter housing 23 is formed with a flat wall structure having a threaded opening 24 therein. This structure has been manufactured in this mode and construction over a number of years, with a manually adjusted valve having an external control knob. The valve has been a conventional flat valve seat unit. Alternatively, a cap and gasket closes the opening for a non-controlled flow system. Generally, where the valve structure and associated flowmeter are used for methanol or like hazardous material, the various parts are secured with fluid tight connections including appropriate gaskets to positively prevent leakage of such material.

In accordance with the illustrated embodiment, the flow control unit 9 is mounted directly to the upper wall structure and includes the valve unit 11 and particularly valve 21 located within the housing. Valve 21 threads into opening 24 and seals the inner passageway and is provided with an outlet aligned with the output connection to line 2. The valve unit 11 projects upwardly from the flowmeter into a control housing 25. A stepping motor 26 is mounted within the lower end of the housing 25 and coupled directly to position the valve unit 11. A manual motor operator 27, shown as a small wheel, is coupled to the motor 26 for selective manual positioning of the valve unit 11. An electronic control module 28 generally includes an appropriate circuit board which is releasably secured within the housing 25 immediately above the motor 26 and adjustment wheel 27. The control module 28 is interconnected to the motor circuit such as shown in FIG. 4 to appropriately drive the motor. A power and signal cable 29 is coupled to the side of the housing 25 and provides for interconnection of the programmed controller 6 as well as the output cable 4 of the meter sensor unit 3 into circuit with the motor 26 for controlling the motor. A selection control unit 30 is connected to the circuit board structures, with appropriate operating units and indicating units provided on a panel in the uppermost end of the front housing wall. In the illustrated embodiment an automatic/manual selection actuator, shown as a pivotal lever or arm, input unit 31 is mounted to the wall and, as more fully developed hereinafter, actuates an appropriate switch unit for setting of the motor 26 for operation in a manual mode or alternately in an automatic mode responsive to the output of the sensor unit 3. In the manual mode, a drive control actuator 32, also shown as a lever or arm, is mounted to the front of the housing 25 operable between a neutral position permitting automated control, an upper position 34 for energizing of the motor 26 to open the valve 21 and an alternate down position 35 for energizing of the motor 26 to close the valve 21. In addition, a high limit lamp 36 and a low limit lamp 36a are mounted to the panel and provide outputs directly indicative of the flow rates reaching one or the other limits. Lamps 37 and 37a are mounted adjacent actuator 31 for identifying the manual and auto setting of member 31. The same lamps 36, 36a, 37 and 37a are used to indicate other conditions as more fully developed hereinafter.

The housing 25 has an opening 38 in the front wall immediately beneath the panel for control unit 30. A cover 39 is releasably secured to the housing to releasably close opening 38 and establishing access to the internally mounted components including wheel 27, module 28 and other components as hereinafter described.

The present invention is particularly directed to the construction of the motorized control valve 21 and the controlled drive system for the motor 26. The other components are preferably constructed in accordance with the prior flowmeters of the assignee as discussed above. The valve and its control are therefore described in detail with the other components described with such reference as necessary to a full and clear understanding of the structure and functioning of the illustrated embodiment of the invention.

Referring particularly to FIGS. 2 and 3, the motorized valve unit 11 and particularly valve 21 includes a valve body 40 having an offset portion which is secured within the upper end of the flowmeter body or housing 23. In the illustrated embodiment of the invention, the valve body 40 is threaded into the threaded opening 24 in the meter body 23 with a gasket 41 secured therebetween. The valve body includes a central opening 42 into the flowmeter passageway 10. A valve orifice plate 43 is secured to the bottom opening in any suitable manner. In the illustrated embodiment of the invention, an adhesive 44 is interposed between the innermost end of the valve body 40 and an offset mating portion of the orifice plate 43 to securely fix the plate to the valve body. The orifice plate 43 projects inwardly into the valve body and particularly into an enlarged chamber 45 having equicircumferentially spaced openings 46 for discharging of the fluid into the exterior of the valve body and thus to the outlet line connector 22 and to line 2. The orifice plate 43 includes a central orifice 47. The innermost end face of the orifice plate is formed as a substantially planar plate member having a recess 48 with an O-ring seal 49 located within the recess and projecting outwardly therefrom in a released state. The O-ring seal 49 bears against the end face of the flowmeter's end wall structure and provides a fluid tight connection to the flow passageway whereby all of the gas flows through the flowmeter is directed through the orifice plate 43 and particularly orifice 47 into the line connector 22.

In accordance with the illustrated embodiment of the invention, a valve stem unit 50 has an enlarged piston 51 slidably mounted within an outer bore 51a of the valve body opening 42 and includes a specially formed valve stem 52 projecting downwardly through the orifice 47. The valve stem unit 50 is slidably mounted for precise axial positioning in the orifice 47.

The orifice 47 is formed with a circular edge 53 at its outermost face. The orifice 47 is formed with a round constant diameter opening wall with a sharp circular edge 53, as most clearly shown in the enlarged view, FIG. 3a. The orifice 47 thus defines an essentially edge flow control with respect to the valve stem 52.

The valve stem 52 is shown as an essentially solid member projecting through the orifice 47. The surface of stem 52 has a reverse taper with respect to that of the orifice 47. Thus its diameter is provided with a progressive decrease from the outer end to the inner end such that as stem 52 moves into the orifice, the stem tends to close against the edge 53, and conversely when the stem 52 moves outwardly of the orifice, the flow opening between the stem and the edge of the orifice increases.

As shown in FIG. 2, stem 52 in the illustrated closed valve position has an extended end projecting significantly beyond the orifice plate 43. The inner end of the orifice plate 43 includes a circular recess 53a providing an essentially unobstructed flow path from the meter passageway 10 to the orifice 47. Thus, the illustrated valve stem 52 extends a number of multiples inwardly of the orifice 47. The same basic stem unit 50 may be formed with stems having slightly different taper angles and mounted within the same orifice, with each stem unit controlling a particular S.A.E. flow range through the orifice. The valve structure is thus preferably formed with the valve plate separately secured to the outer valve body and the valve stem unit releasably connected to the extension of the motor driven shaft 57 to provide a basic flowmeter for a wide range of flows, such as required by the many industrial applications and the like.

Figure 4A:
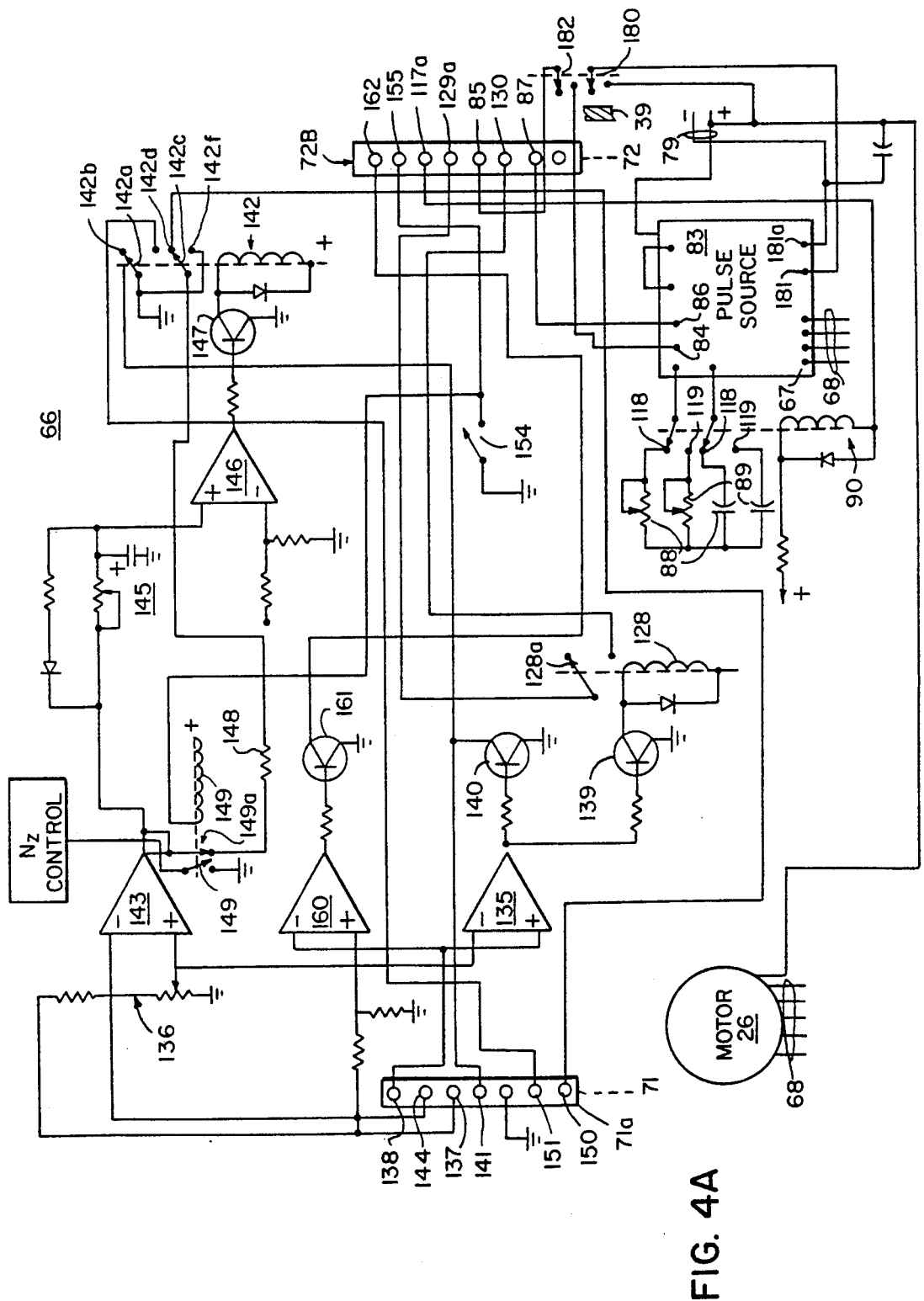
Figure 4B:
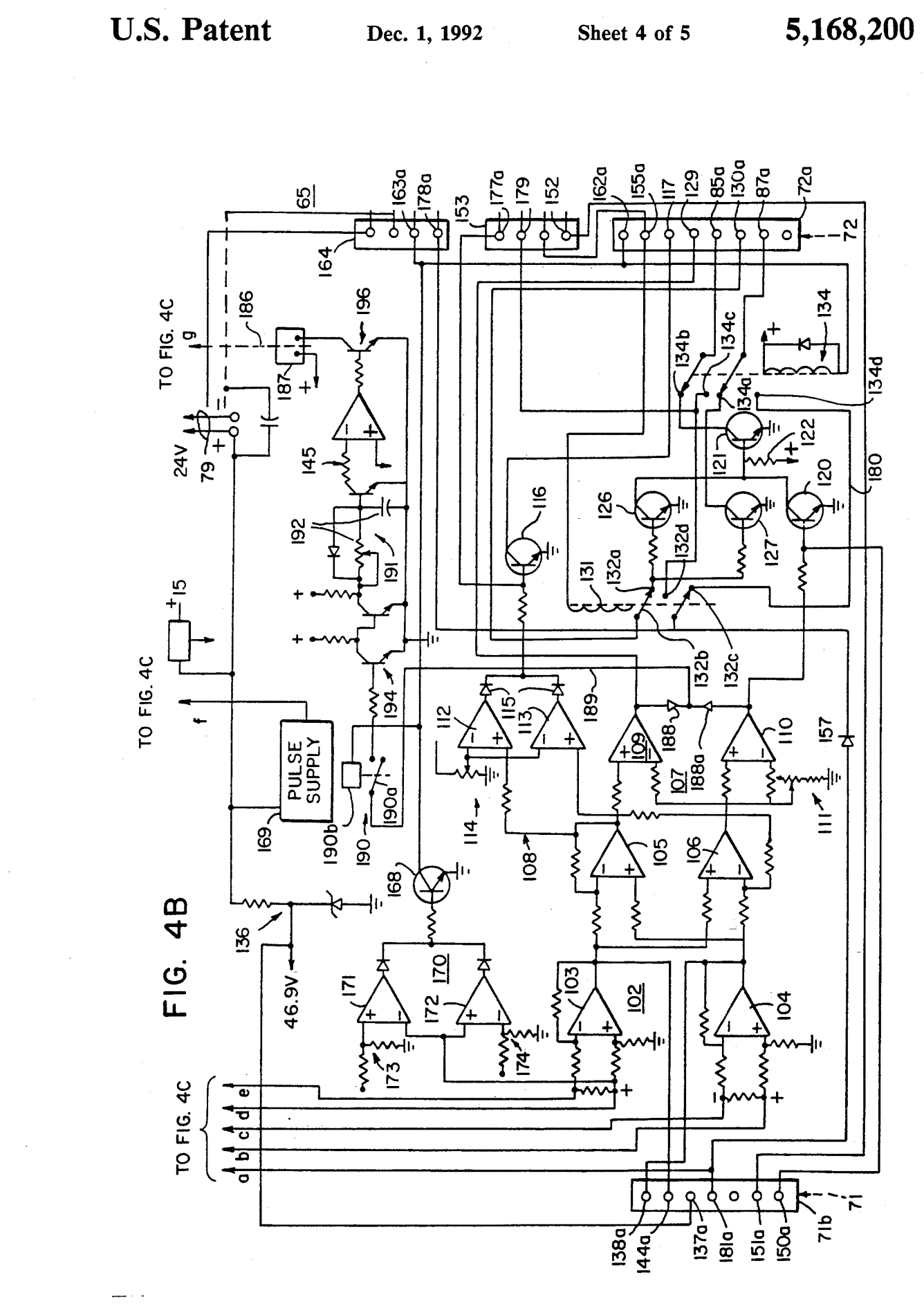

Although shown with constant diameter orifice 47, the orifice may be formed with an expanding taper from the sharp edge 55, as shown in phantom in FIG. 3a. As previously discussed, the illustrated round orifice provides a substantial relationship between the flow and the position of the valve stem 52 at low flows but with linearity decreasing with the larger flows within the flow range. The non-linearity can be minimized by providing the tapered orifice having the reverse taper from that of the valve stem 52. In a preferred system for eliminating the non-linear effect, a programmable controller is used to compensate for such non-linearity by appropriately varying the positions of the valve stem. A suitable control system is shown in FIGS. 4a and 4b and fully described hereinafter.

The orifice plate 43 and the valve stem unit 50 are removably and separately provided to permit varying of the flow opening of the valve 21 for different flow arrangements. The orifice plate 43 and stem 52 are thus conjointly designed for flows in a selected flow range, as more fully discussed hereinafter.

The valve stem unit 50 is coupled to the stepper motor 26 for axial, linear positioning of the stem 52 within the orifice 47. The motor 26 is mounted to the upper end of the valve body and located within the control enclosure or housing 25.

The stem body 51 is shown enlarged and having a diameter generally corresponding to the bore 51a of the valve body 40 with a close sliding fit within the bore. Body 51 is shown integrally formed with the valve stem and has an annular sealing recess 54 intermediate its length. An annular seal 55 is located within the recess and slidably engages the face of the bore to seal the opening. The annular seal 55 is illustrated in a preferred construction as a cup-shaped member having side lips 56 defining a recess opening inwardly toward the flowmeter. Any gas leaking past the interface between the valve stem body 51 and the bore enters into the recess and maintains the prestressed or precompressed lips 56 and maintains a firm seal between the bore and the stem body, with a relative low frictional force loading of the stem. The structure may be formed with self-lubricating materials, depending upon the fluids being metered and the like.

The motor driven shaft 57 of motor 26 extends downwardly through the bore 51a into an appropriate opening in the outer end of the valve stem body 51. A set screw 57a or other suitable connector, fixedly secures the valve body to the shaft 57 for simultaneous axial positioning of the assembly.

The motor 26 is fixedly shown secured to the upper end of the valve 21 as follows: An encircling locking collar 58 is threaded onto and fixed to the uppermost end of the valve body 40. The collar 58 defines a planar surface with the upper end of the valve body. A base plate 59, having a central opening somewhat larger than that of the bore but less the outer diameter of the valve body, is secured to the circular collar 58 as by a plurality of circumferentially distributed self-locking bolt units 60. The motor 26 is formed with an appropriate mounting plate 61 for mounting of the motor to the valve assembly as by bolt 61a. A locating ring 62 projects downwardly from the underside of the plate 61 and motor 26 and forms an extension of the motor housing to accurately locate the motor in concentric location with the outermost end of the valve body 40. The valve body 40 includes a small outward hub projection 63 which is very accurately machine formed and mates with the inner opening of the locating collar 62. The locating ring 62 is press fitted, or otherwise fixedly secured to a small bearing housing 62a which precisely locates the ring 62 relative to the motor and particularly shaft 57. The motor and shaft 57 are thereby precisely located with respect to the valve bore 51a and the valve stem unit 50.

The motor 26 and particularly the motor shaft is accurately located on an axis 64 coincident with the axis of the valve stem unit 50 and in particular the axis of the valve stem 52 and the orifice opening edge 53. The valve stem 52 is accurately and precisely positioned in a axial direction as a result of the energization of the motor 26, or alternatively by the manual turning of the valve shaft through the illustrated manual adjustment wheel 27.

The stepping motor 26 is a well known, readily commercially available stepping motor and may, of course, be formed of any suitable or desired construction providing the desired accuracy, and is shown as having an integrated rotary to linear motion output at motor driven shaft 57. In a practical construction, a stepping motor manufactured and commercially available from Hurst Manufacturing with a Hurst No. SX5.4104.003 has been satisfactorily used in a valve assembly for monitoring of gas flows in the S.A.E. range of ten to thirty four hundred, with the valve assembly having an appropriate orifice plate and valve stem unit for a particular flow range. In accordance with known constructions, the stepping motor 26 has a suitable rotary output. A rotary to linear converter unit, not shown, connects the shaft 57 to the rotary output of the motor, not shown. Generally, the motor shaft may have a threaded portion coupled to a rotating gear and thereby providing a linear shaft motion with the shaft held against rotation. The shaft 57 is held against rotation in the normal mode of controlling the valve unit. In the illustrated embodiment, the handwheel 27 is secured to the shaft 57 by a setscrew 62a or similar releasable connection. The wheel 27 is further provided with an edge slot 64a. The cover 39 has a plate 59 vertical oriented and aligned with the slot 64a. The motor shaft 57 is thus coupled to the rotary output of the stepping motor 39 and with cover in place and plate 59 in slot 64a, such that the shaft is prevented from rotation, the rotation of the motor moves the shaft 57 in a linear direction on the axis of the shaft. Conversely, with the motor 26 de-energized and the rotary output is in a fixed position, physical rotation of the wheel 27 and shaft 57 results in a simultaneous linear movement on its axis. The motor 26 may include a suitable brake means, such as dynamic braking to hold the rotary output fixed, when the motor is off, such as more fully disclosed in the modification of the circuit shown in FIG. 5. The outer end of the shaft 57 projects outwardly from the motor 26 within the control housing 25. The manual wheel 27 is secured to the upper end thereof for rotating the shaft with the motor de-engaged for positioning the valve.

The motor 26 is enclosed within the control housing 25. A control circuit board 65 and a main power circuit board 66 are releasably secured within the upper end of the housing in upwardly spaced relation to the thumb wheel. The front of the housing 25 is provided with the substantial opening 38 permitting the access to the adjustment wheel 27 and the circuit boards 65 and 66 for insertion and removal thereof as required as well as the motor and its physical connections. The circuit board is flush with the sides of the control box. A suitable multiple pin releasable connector 67 provides for releasable connection between the stepper motor cable 68 and the circuit board 66. The main input/output cable 29 is secured to the side of the housing 25 above the circuit board 65 and is interconnected to the circuit board and the control components through an appropriate releasable connector unit 69, as diagramatically shown in FIG. 2, for completing power and control connection between the motor 26, the manual controls, the output of the sensor unit 3, and the process controller, data logger where used, and the like. The interconnecting cables from the sensor and from the control box are preferably connected to a suitable terminal board 70 provided by the customer. The customer also supplies the necessary power supplies include a 115 volt supply for operating a main off/on solenoid as well as the low voltage DC supply (24 volt) for operating of the stepper motor 26 and the control system such as shown in FIG. 4.

The upper end of the housing 25 is also provided with an access wall 71 to permit direct access to the LEDs, the mechanical switches and the electrical connections therein. The motorized control valve assembly thus provides a single integrated package requiring only the two separate cable connections for establishing the complete operating and control system through the external customer supplied terminal board 70.

The motorized control unit with the various controls is readily applied to the various flowmeter assembly such as shown in the previously identified patents as well as directly to any current production of such flowmeters as well as others providing for the interconnection of the special tapered valve unit and the motorized control circuit to the necessary inputs. In the manual mode, the control unit is in essence disabled and the unit responds directly to the signal generated by the up and down switch unit. With the manual/auto operator set to the manual position, the sensor unit is effectively disabled and the up and down operator enabled. The up switch operator provides for a direct signal to the motor 26 to open the valve 21 while the down switch operator provides for a reverse signal energization of the motor 26 to close the valve 21.

The assignee of the invention manufactures a line of flowmeters for precise measurement and control of gas flows in a range of S.A.E. flows of ten to greater than thirty-four hundred. The present invention with the valve cage and orifice structure and tapered valve stem unit have been designed with four basic cage structures, which in turn are provided with an appropriate orifice plate for each range. The valve stem structure having a basic stem diameter for each range, and within each range the valve stem unit is formed with a somewhat differing angle. Thus, a first range covers S.A.E. flows between 10 and 18, the orifice has a diameter of 0.375 inches and the valve with the valve stem having a taper angle varying between 0° 40' and 4° 30'. The fourth range covers six S.A.E. flows varying from five hundred seventy to thirty-four hundred with an orifice plate having an orifice diameter of 1.437 inches, a valve stem body having a flow related diameter of 1.500 inches and valve stem taper angle varying between 7° 45' and 32° 30'. The valve stem moves from the extended position through the orifice upwardly out of the orifice and in spaced relation thereto for full flow with minimal back pressure. The total extended travel compensates for back pressure effects in the valve. The valve stem has a total selected movement such as one inch with an orifice depth of approximately three eight inches. The different orifice plates are selected for different flow ranges and with depth and angles selected to compensate for back pressure conditions.

Figure 4C:
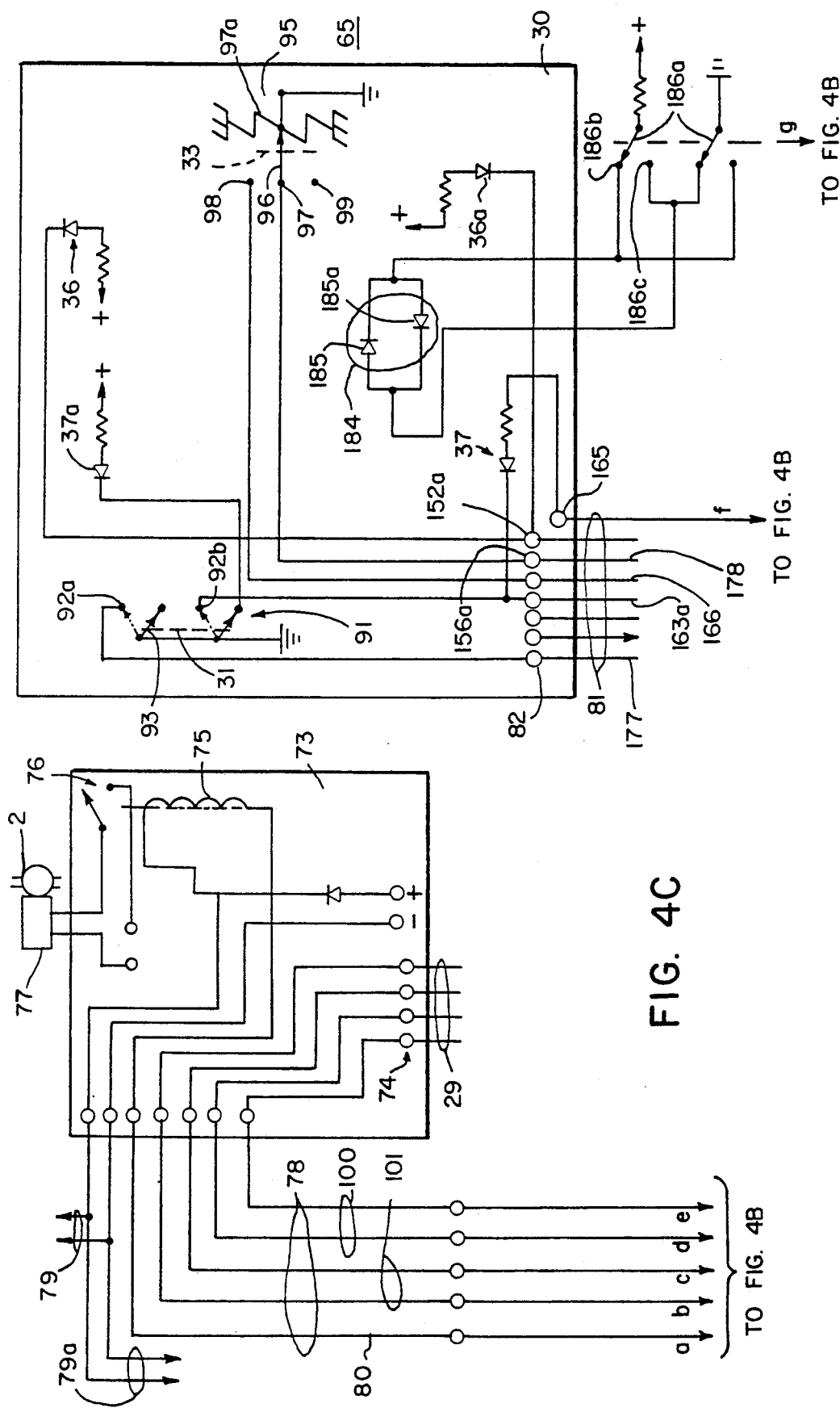

Referring particularly to FIGS. 4A and 4B, a schematic illustration of an embodiment of the control for operating of the motor in a rapid and effective manner is illustrated. Generally, the illustrated circuit is shown divided into a motor drive circuit board 66 for the motor, coupled to the motor through a cable 68. The motor circuit board 66 is connected to a control circuit board 65 through a first terminal connector 71 having one part 71a on the board 66 and the complementary part 71b on the control board 65. A second terminal connector 72 interconnects the drive output and certain interlocking circuits to the motor circuit board 66 and includes the one terminal part 72a on the control circuit board 65 and a second complementary part 72b on the motor circuit board 66. The connectors 71 and 72 are shown as releasable complementing pin and socket connecting members or parts and are so described hereinafter. The complementary pin and sockets are given a corresponding number with one distinguished by a letter. The 24 volt supply required for operating the system as well as the control signals from the head and the programmed demand signal from the controller are interconnected to an input supply circuit board 73, shown including the interconnecting input terminal strip 74 (FIG. 4C). The supply circuit board includes an interlocking relay 75 controlling a set of contacts 76 in response to application of the 24 volt control power and an associated ground interlock. The contacts 76 control the main solenoid 77 in the flow line 2 for the metered gas. In the absence of an appropriate 24 volt supply, the relay 75 is de-energized, the main solenoid valve 77 remains closed and the flow cannot be established, as hereinafter described.

The signals from the meter head 3 and the controller 6 are coupled via the common cable 29 to the supply circuit board and provide appropriate signals from the sensor unit 3 and from the programmed controller 6 via a cable 78 to the control system 65. The 24 volt supply is connected from board 73 by separate cables 79 and 79a to the control circuit board 65 and to the motor board 66. Each cable 79 and 79a is separately by-passed to ground by a capacitor 79b and 79c, respectively. The separate by-passed cables were found desirable to avoid feedback between the two circuits. The several relays and other components connected to the 24 volt supply are labeled by a symbol for clarity of illustration. A relay interlock line 80 is illustrated forming a part of the cable 78 and interconnecting the return side of the interlock relay 75 to ground through the control circuit board 65. Interlocking for the manual control unit and the interrelated displays of the panel 30 are interconnected through a cable 81 from a connection or terminal unit 82 to the control circuit board 65 for receiving power and interlocking signals for energizing the several indicator lamps and providing certain interrelated automated switching between an automatic state or mode and a manual state or mode of operation in accordance with the description as hereinafter given.

MOTOR DRIVE

More particularly, the motor circuit board 66 includes a suitable pulse supply source 83 for pulsed energization of the stepper motor 26. The source 83 is shown as an integrated circuit interconnected through the drive cable 68 directly to the motor 26. The source 83 circuit includes an internal pulse generator, not shown, adapted to establish a pulse signal output to the motor 26 for driving of the motor in either direction, that is, clockwise or counterclockwise direction. The source 83 is activated to establish an output pulse train to the motor 26 by removing ground from an input control pin 84. The source 83 is effectively turned off by grounding the pin 84. Grounding is accomplished through an interconnecting lead having a common interconnection to a pin 85 on connector 72b and socket 85a on socket connector 72a, as more fully developed hereinafter. The directional control is established by establishing a ground signal at pin 86 of source 83. Pin 86 is connected via a lead with a pin 87 on pin connector 72b and a socket 87a on socket connector 72a, on the motor board 65 and the circuit control board 65, respectively, as hereinafter described. In addition, in the illustrated embodiment, the motor 26 is adapted to be operated at two different stepping speeds, identified as a high speed and a low speed. R-C networks 88 and 89 are illustrated coupled via the contacts of a relay 90 to inputs on the integrated circuit source 83. With the relay 90 in the low speed position, resistor and capacitor network 88 is connected to establish a relatively low or slow rate pulse train signal to the motor 26. Energization of the relay 90 switches the input to the alternate resistor and capacitor network 89 which increases the pulse train rate generated by the integrated circuit source 83 and thereby increases the stepping speed of the stepper motor 26.

With power supplied to the source 83 via the cable 79, the pulse motor 26 is adapted to be driven either in the automated mode or the manual mode, depending upon the position of the selection or mode actuator 31 which is coupled to operate switch 91, at the panel 30.

AUTO/MANUAL MODE SELECTION

As shown on the display panel board 30 in FIG. 4C, the manual/auto selection switch 91 is a double pole, double throw unit and in the automatic position removes signals from the control circuit board 65 and places the board in a condition for automated operation. The indication lamp 37a, shown as an LED, is connected to the incoming 24 volt power supply and to ground through the auto switch contacts 91a of the selection switch 91. The lamp 37a is turned on, with a particular color such as green indicating the automatic operating state. In the manual position (shown in phantom) of the selection switch 91, a pair of contacts 92a and 92b are grounded by the movable contacts 93 and interconnected through leads of the interconnecting cable 81 to board 65, and effectively disable the automated response. Simultaneously, switch 91 operatively connects the manual directional switch 95, shown as a single pole, triple throw position switch into circuit. The directional switch 95 has a movable grounded contact 96 which is connected directly to ground and selectively engages contact 97 which is connected to a lead providing an interlock into the automated control system. The contact 9b has a pivotal arm which is spring-loaded as by springs 97a to a center position engaging contact 97 located to the opposite sides of contact 96 and the spring loaded contact 96 must be positively held in engagement with either contact 98 or 99 to manually control the valve motor 26. The "up" contact and down contact 98 and 99 are located to the opposite sides of contact 96 and the spring loaded contact 96 must be positively held in engagement with either contact 98 or 99 to manually control the valve motor 26, and are connected in circuit as hereinafter described to provide direct stepping movement of the stepper motor 26 and the valve 21 under manual control.

AUTOMATIC CONTROL OF VALVE 21

In the auto position of the selection switch 91, the motor 26 is driven in accordance with the relative signals received from the sensor head 3 and the controller 6. The signals are selected to provide a minimum signal and a maximum signal proportional to the desired flow rate; selected in a practical environment to vary between 4 and 20 milliamps. A 20 milliamp signal generates maximum flow rate signal, either on demand or actual flow, and a 4 milliamp signal is indicative of the minimum flow rate. The signals are isolated and applied via paired leads 100 and 101 from board 73 as illustrated.

The control circuit board 65 includes a comparator unit 102 for comparing the relative level of the signal from the head leads 100 and from the controller leads 101. In the illustrated embodiment of the invention, the comparator unit 102 includes a first amplifier 103 connected to the signal from the head leads 100 and a second amplifier 104 similarly connected to the controller leads 101. The output of the amplifier 103 and 104 are connected to a pair of similar amplifiers 105 and 106 connected to define a comparator circuit. The output of the head amplifier 103 is connected to the inverting input of the one amplifier 105 and the non-inverting input of the opposite amplifier 106. Similarly, the controller amplifier 104 has its output connected to the non-inverting input of the first comparison amplifier 105 and the inverting input of the second comparison amplifier 106. The higher signal at the positive input of the amplifiers 105 or 106 turns the corresponding amplifier on and the opposite amplifier of the comparison circuit off. Amplifiers 106 and 105 each have a feedback resistor 105a and 106a, respectively, between the output and the inverting inputs. The resistors change the comparator action from an instant transition from off to on to a gradual build-up of output voltage depending upon the different signal of the amplifier inputs. Only one of the amplifiers 105 and 106 will therefore be gradually turned on in accordance with the relative signal levels from the head 3 and from the controller 6. The head-related comparator amplifier 105 when "on" drives the motor 26 to open the valve. Conversely, the controller-related amplifier 106 drives the motor 26 to close the valve 21.

The output from the amplifier 106 builds up gradually to a voltage into amplifier 110 and operates the latter when the voltage at the non-inverting input from amplifier 106 goes slightly higher than the reference voltage on the inverting input of amplifier 110. Adjusting the low window reference (shown including the adjustable potentiometer 111) changes the signal level around the set points to determine the accuracy of set point and neutral zone of motor operation. The operation of the high window amplifiers 112 and 113 is similar, such that adjusting the reference circuit 114 determines window width of operation of high speed conversion from low speed to high speed motor operation.

The same action is established when the level of the head signal from amplifier 103 is larger or higher than the control signal from the controller. Thus, the output of amplifier 105 gradually builds up and provides a corresponding signal to the non-inverting input of amplifier 109, which is reference to the same reference as amplifier 110.

The amplifiers 105 and 106 are connected to a low window circuit 107 and a high window circuit 108. The low window circuit 107 includes output amplifiers 109 and 110, each having one input connected to the corresponding related amplifier 105 and 106 and the other input connected in common to each other and to a range control biasing circuit 111, shown as an adjustable potentiometer circuit.

The circuit of window 107 is established to be operative with the differential between the two signals varying by less than 5% of the total range. If the difference in the signals increases to 5% or more, the window circuit 108 is controlling and includes a second set of amplifiers 112 and 113 similar to those just described, with one input connected to amplifier 105 and 106 and the second inputs connected in common to a reference source 114 and establishing an output to operate the motor at the high speed as more fully developed hereinafter.

If the signal differential is 5% or more of the total maximum difference in signal levels, as reflected in the level of the output voltage level of amplifier 105 or 106, one of the amplifiers 112 and 113 on board 65 is energized to establish an output signal at the common connection from the amplifiers, with isolating diodes 115 isolating the two outputs and permitting establishment of an output at the common line, in accordance with the differential signal being more than 5% of the accepted range difference. The output is connected to drive a transistor 116 "on". The output of the transistor 116 establishes a ground connection which is connected to socket 117 of socket connector 72a and thereby to pin 117a of pin connector 72b on the motor board 66. Pin connector 117a is connected via a lead to ground the relay 90 on the motor board 66 and energize relay 90. When the relay 90 is energized, contacts 118 disconnect the low speed resistor and capacitor network 88 and contacts 119 connect the high speed resistor and capacitor network 99 to source 83, thereby increasing the pulse rate output and the speed of the motor 26.

The low window circuit 107 establishes the output to actuate the motor 26 in the appropriate direction.

When the controller signal is smaller than the meter head signal, amplifier 110 is "on" and is connected directly to the input of a transistor 120 which turns "on". The output of transistor 120 provides a down or close output signal to an enable transistor 121. Transistor 121 has a base connected via a resistor 122 to the 24 volt bus and is normally conducting. When transistor 120 conducts, the base of transistor 121 is grounded and held off, thereby removing ground from its output. The output of transistor 121 is connected via contacts 134*b* of a manual/auto relay 134 to the socket 85*a* of terminal connector 72*a* and thereby to the pin 85 of the motor circuit board connector 72*b*, and as previously noted selectively grounds and releases the source 83 via the enable pin 84. The turn-off of enable transistor 121 removes the ground from pin 84, and the source 83 is activated and transmits a train of pulse signals to the pulse motor 26 at the normal low speed.

The motor 26 thus operates to close the valve 21 at the low speed unless the differential in the head and control signals is greater than 5% of the total possible difference. In the latter event, relay 90 is energized as previously discussed and automatically moves to the high speed range to rapidly drive the motor 26 and move the valve 21 to the closed position. As the valve 21 closes, the differential of the signal decreases and when it drops below 5%, transistor 116 turns off as a result of the turn "off" of the conducting amplifier 112 or 113, relay 90 is de-energized and reset its contacts to close contacts 118 and again insert the low speed network 88 and thereby automatically revert to the low motor speed, as the valve approaches and moves to the desired setting.

If, however, the controller signal is larger than the head signal and indicating that the valve 21 must be opened, the amplifier 109 provides an output to drive the motor 26. The motor 26, of course, must operate in a reverse direction.

The valve opening amplifier 109 is connected to drive a transistor 126 "on" and simultaneously to drive a directional transistor 127 "on" to establish energization of the motor 26 to open the valve, as follows. The circuit for circuit connection between the amplifier 109 and the transistor 126 and 127 includes an interlock relay 128 on board 66. The output of amplifier 109 and the safety interlock relay 128 on motor board 66 is connected to prevent opening of valve 21 if the signal from the controller 6 is below the minimum level, and generally below a level slightly above the minimum level, as more fully described hereinafter. The relay 128 has a set of normally open contacts 128*a* connected in series with the output connection of amplifier 109 to transistors 126 and 127. Referring to the control board 65, the output of amplifier 109 is connected to socket 129 of strip connector 72*a* and through the complementing pin 129*a* of connector 72*b* connected to the movable contact of relay contacts 128*a*. The opposite side of the relay contacts 128*a* is connected to the pin 130 of connector 72*b* and to socket 130*a* of connector 72*a*. Socket 130*a* is connected to a normally closed contact 132*a* of a double pole, double throw switch unit 131. The normally closed contact 132*a* is connected by the engaged movable contact 132*b* directly to transistor 126 and 127 for energizing of the motor 26 with an appropriate rotation. A second contact 132*c* of the double pole, double throw relay 131 is connected directly to an "up" drive lead for manual control as hereinafter described. The opposite contact 132*b* is connected in common to the bases of the transistors 126 and 127. With the relay 131 in the normal illustrated position, both transistors 126 and 127 are energized. The ouput of the transistor 126 is connected to turn the enable transistor 121 "off" and thereby provide a signal via socket 85*a* and pin 85 of connectors 72*a* and 72 to the drive input pin 84 of the source 83 in the same manner as the turn on of transistor 121 by the "down" or close control transistor 120, as previously described. Simultaneously, the transistor 127 is energized, and provides a ground signal via terminal socket 87*a* and pin 87*a* of connector 72*a* and 72*b* to the directional control pin or input 86 of the pulse source 83 on board 66. The signal at input 86 reverses the pulse train supplied to the stepping motor 26 and, in accordance with known functioning, reverses the direction of the motor.

The high speed control inserted by the circuits 107 and 108 again is coupled through the transistor 116 to drive the motor either at a high or low speeds, depending upon the signal differential requiring the opening of the valve. The motor 26 again operates in an appropriate direction to open the valve to balance the signals of the sensing unit or head 3 and the controller 6.

Transistors 121 and 127 are also coupled in circuit through a manual/automatic relay 134 having the full line position establishing an automatic response and an alternate phantom line position for connecting the transistors into circuit for operation of the motor in the manual position. Relay 134 is a double pole, double throw unit having fixed contacts 134*a* and 134*b* connected to the output of the transistor 127 and transistor 121, respectively. Relay contacts 134*c* and 134*d* establish inputs for up and down energization of the motor in the manual mode.

Interlock relay 128 which controls the opening of the valve 21 as described previously has its contacts 128*a* normally open if the output of the controller is below a set lower limit. The relay 128 must therefore be energized to complete the circuit to drive the motor up and open the valve and does so only if the controller is set above the limit. The relay 128 is controlled by the sensing of the signal from the controller 6 via a reference amplifier 135 on board 66. The controller signal must be above the minimum demand level of 4 milliamps and as previously noted, preferably slightly above, such as 4.17 milliamps. The comparator referenced amplifier 135 has a first negative input connected to a reference voltage circuit 136 on board 65, and particularly through pin 137 and socket 137*a* of connectors 71*a* and 71*b*. A second positive input to amplifier 135 is connected via the pin 138 and socket 138*a* of the connectors 71*a* and 71*b* to the output of the controller amplifier 104 on board 65. The output of the IC amplifier 135 is driven "off" with the controller signal below 4.17 milliamps. Amplifier 135 is conversely driven on at 4.17 milliamps and above from the controller. The output of the IC amplifier 135 is connected to drive a transistor 139, the output of which is connected to the ground side of the relay 128. If the signal is at 4.17 amps or above, the amplifier is driven on, transistor 139 conducts and the relay 128 is energized and contacts 128*a* close and enables the automatic control circuit. If the signal from the controller 6 is below 4.17 milliamps, the amplifier 135 is driven off, transistor 139 is turned off and the relay 128 de-energized, thereby preventing completion of the control circuit to open the valve 21.

The output of the lower limit reference amplifier 135 is also connected to control a transistor 140 on board 66 which is connected to ground a line connected respectively to the terminal pin 141 and socket 141*a* of connectors 71a and 71b on the boards 65 and 66. The same line is also connected to relay contact 142a of a relay 142 or board 66, having normally closed contacts to also turn on the low limit lamp, as hereinafter described.

Socket 141a is connected to the ground lead 80 from the input board 73 for solenoid relay 75 and maintains power to the relay and thereby the solenoid 76 under normal operation. Thus, with the amplifier 135 establishing an output and indicating a controller demand signal above 4.17 amps, the ground side of relay 75 is grounded and the main solenoid 77 is held open.

The solenoid relay 75 is also energized with a connection to pin 141 of connector 71a to establish an alternate ground path from that of transistor 140 via the normally closed contact arm 142a and a contact 142b of a relay 142. Contact 142b is connected via pins 141 and 141a to the ground line 80 to the solenoid relay 75. Relay 142 is operated to control its contacts in response to establishing of a low limit head signal, as follows.

An IC reference amplifier 143 has its positive input connected to same reference signal source in common with the IC reference amplifier 135. The negative input of the amplifier 143 is connected to the pin and sockets 144 and 144a of the connectors 71a and 71b on the board 66 and 65. Socket 144a on board 65 is connected to the output of the head sensor amplifier 103. The amplifier 143 compares the head control signal with the reference signal. If the head signal is above 4.17 milliamps, the amplifier 143 is held off. At a signal below 4.17 from the head, the amplifier 143 is "on" and applies a signal to a signal time delay network 145. After a short period, such as two seconds, the time delay network 145 establishes a signal which is applied to the positive input of an IC amplifier 146 and turns the amplifier "on". The output signal of amplifier 146 is connected to turn a transistor 147 on and energize relay 142. The relay 142 is a double pole relay having the first movable contact 142a connected to ground and contact 142b as previously described. A second movable contact 142c of relay 142 normally engages a contact 142d which is connected in circuit directly to the output of the lower limit reference amplifier 143 to energize the closing transistor 120 on the control board 65. Thus, contact 142d is connected in series with a resistor 148 and relay contacts 149a and 149b of a high limit relay 149 to the output of the limit reference amplifier 143, which provides a feedback signal to the down transistor 120 via the engaged contacts 142c and 142d, and pin 150 and socket 150a of connectors 71a and 71b.

During the time delay period of the timing network 145, the motor 26 is energized in the down direction to provide a firm closing of the control valve, and thereafter serves to open the ground circuit to the solenoid valve as a result of the switching action of the relay 142.

The alternate contact position of the relay 142 include a contact engaged by the second movable contact arm 142b upon energization of relay 142. The first movable contact arm 142a is moved by relay 142 when energized to engage a contact 142e which is connected to ground the pin and socket 151 and 151a of strip connectors 71. Socket 151a on the control board 65 is connected via a lead to a pin 152 on a pin and socket connector 153 on board 65. Pin 152 is connected to the control panel via cable 81 and particularly a terminal pin 152a which is in turn connected to the return side of low limit lamp 36a, which preferably presents a related color display. The lamp, for example, is preferably provided with a cover displaying a red light indicating a low limit has been reached. The opposite side of the lamp is connected to the 24 volt supply at the panel and with the ground connected to the cathode of the LED lamp, the lamp is illuminated to indicate the positioning of the valve 21 in the low limit position.

Relay 142 has a normally open contact 142f engaged by movable contact 142c when relay 142 is engaged. Contact 142f is connected to ground via a lead 153a in common with the movable contact 142a and thus in the energized state grounds the down transistor 120 via the pin and sockets 150 and 150a. This limits the closure action at shutdown in the event adjustment was not perfect.

As previously discussed, the high limit relay 149 on board 66 (FIG. 4A) includes a set of normally close contacts 149a in the low limit control circuit. The relay 149 is connected for operation to a control line including a normally open limit top switch 154 connected to ground. The switch 154 is a small micro switch located in the path of the manual positioning wheel 27. When the switch 154 (FIG. 2 and FIG. 4A) is closed, the relay 149 is energized through the 24 volt supply connected to the relay at the motor board 66. The relay contacts 149a open, thereby removing the output of the lower limit reference amplifier 143 from the contacts 142b and positively opening the previously described circuit to the "down" transistor 120.

The relay 149 also includes a set of normally open contacts 149b connected via a lead to a top limit lamp 154a on a nitrogen control panel, not shown. Thus, actuation of switch 154 to indicate a maximum methanol flow is indicated on both gas panels.

The top limit switch 154 also directly grounds the pin 155 and socket 155a on the connectors 72b and 72a. Socket 155a is connected to the ground side of the relay 131 on board 65 which is thereby energized as a result of the 24 volt connection to the power side of the relay. This reverses the contact 132a to open the connection to contact 132b connected between the "up" signal drive line and the transistors 126 and 127 for opening the valve 21. Simultaneously, the relay 131 completes a connection to a contact 132c which is connected to pin 156 of the power strip connector 164 on the control board 65. The movable contact 132 of relay 131 is connected to the ground lead 80 of the solenoid relay 75 in series with a diode 157. If the ground connection is removed via amplifier 135, a positive power may still be established through the diode 157 from the relay line and through the circuit to the control panel and particularly the "up" contact 97. Diode 157 and contact 132c is connected via a lead to the terminal pin 156 and to terminal 156a on the control panel 30 which is connected to the return side of the high limit lamp 36. The opposite side of lamp 36 is connected to the 24 volt supply, as shown, and lamp 36 is "on" when the top limit switch 154 closes to establish the ground connection at pin and sockets 155 and 155a. Simultaneously, the return side of relay 131 is grounded which is energized with turn on of the high limit lamp on the panel. It thus effectively limits any further signals including manual signal from opening the valve 21 and limits the system to manually closing the valve 21.

The low limit controller and head signal circuit includes a further reference amplifier 160 on board 66 forming a continuity detection unit monitoring the demand signal from the controller. The negative input of the amplifier 160 is connected to the controller input in common with the positive input of the reference amplifier 135. The positive input of amplifier 160 is connected to a low level input signal. The amplifier 160 is on whenever the controller signal is above the minute level of 0.150 volts, and off at a lower voltage. A transistor 161 is connected to amplifier 160 and conducts under all normal operation as a result of the signal from the amplifier 160. The output of transistor 161 is connected to a pin 162 and socket 162a of connector 72. Thus, if the demand signal is lost or the leads are cut, the demand essentially disappears and amplifier 160 goes low. Socket 162a functions to provide a corresponding ground signal indicative that the controller signal deceased to level indicating a practical loss of signal. Terminal 162a is connected to the ground side of relay 134 to turn on relay 134 and establish the manual control mode. The terminal 162a is also connected to a pin 163 of a strip connector 164, which is connected by a lead to pin 163a on the panel connector 81. Pin 163a is connected to ground one side of the manual lamp 37, the opposite side of which is connected to pin 165 on connector 81, connected in turn to pulse source unit 169 on board 65. The pulse source or circuit 169 includes a capacitive resistive network and a feedback circuitry to provide a pulsed output and energization of the lamp. The "automatic" green lamp 37a will still be on. A combination of the manual lamp 37 and the green lamp 37a simultaneously being energized provides clear indication to the operator that there has been a loss of signal and that if valve control is necessary, actuation of the up/down control lever is required. The lamp 37 has a unique color, such as yellow, and pulsed energization provides a flashing color signal to the operating personnel of the condition. Thus, the opening of the control loop holds the valves in the last flow position and inserts the manual control, with appropriate signals to the operation.

Energization of the relay 134 is also established to automatically disconnect the automatic control state with the selection switch 91 in the automatic position by interconnection to a cable head continuity sensing unit 170 connected to monitor the head cable 4. The unit 170 on board 65 includes a pair of amplifiers 171 and 172 on board 65 having the opposite polarity inputs connected in common to the positive side or lead of the head leads 80. The opposite set of inputs to the amplifiers 171–172 is connected respectively to separate reference signal circuits 173 and 174. Breaking of either line of the head cable 4 results in a loss of signal at the respective positive and negative input, thereby driving one or the other of the amplifiers 171–172 fully on and thereby driving a transistor 168, which as described above is connected in common to the manual control lead to energize relay 134 on the control circuit board. The relay 134 is thereby operated upon loss of signal from the head cable, and again sets the system from the auto state to the manual state. The transistor 168 is also connected to the terminal pin 163 and establishes a corresponding flashing energization of the lamp 37.

The system is manually set to a manual control mode by actuation of switch unit 91. The double pole, double throw switch 91 includes first and second manual contacts 92 connected via lines from the control panel to the control circuit board 66. The first "manual" contact 92a of the mode selection switch 91 is connected via the strip connector pin 177 of the connector 83 and pin 177a of connector 153 on board 65 to the base of the transistor 116, which controls the high speed window drive. Grounding the base of transistor 116 positively prevents turn-on of the transistor 116 and thus locks the system in a low speed motor mode.

The second "manual" contact 92b of the selection switch 91 in the manual position grounds signal panel terminal pins 163 and 163a of connecting strips 82 and 164. Terminal pin 163 is connected directly by a lead to the relay 134, as previously described, to energize the relay from the 24 volt supply. The relay 134 is energized, moves its double pole contacts from the full line auto position shown to the alternate manual position.

Actuation of the relay 134, either through manual switch 91 or from the head signal monitor unit 170 or controller signal monitor 160, disconnects the auto control and requires signaling from the up/down directional control lever 33, and switch unit 95, on the control panel 30.

In the standby position of the up/down switch 95, a movable contact 96 engages standby contact 97. Movable contact 96 is connected to ground, and thus grounds contact 97. The contact 97 is connected via terminals 178 and 178a of connectors 82 and 164 to contacts of relay unit 134, and particularly contact 132c. The normally closed contact 132c is connected to contact 134d of switch 134, which has been actuated in the manual mode position. Contact 134d is thereby connected to socket 87a and pin 87 of connectors 72a and 72b. The ground signal of the direction switch 95 is thereby applied to the pin 84 of pulse source 83 to hold the source off. Motor 26 is de-energized.

Placing the up/down switch in the down position, places the grounded movable contact 96 to a dead contact and removes the ground connection from the contact 132c. The pin and socket of strip connectors 72 remove the just described ground signal connection from the source pin 84, thereby energizing of the motor in a direction to close the valve 21.

If the operator wishes to open the valve 21, the switch lever 33 is moved to the up position, thereby grounding the "up" contact 98 of the directional switch, and simultaneously removing the ground from the contact 97 and thereby from pin 84 of the source 83 to establish energization of the motor 26. In the "up" position, the "up" contact 98 establishes a ground connection from the control panel 30 via a pins 179 and 179a of terminal strips 82 and 153 directly to the contact 132a of the relay 131 and, in the actuated position of relay 134 normally open relay contact 134c of the relay 134. In the relay actuated position, socket 85a of connector 72a and pin 87 of connector 72b are grounded and grounds pin 86 of pulse source 83 to reverse the pulse sequence to and thereby the rotation of motor 26. Motor now operates the motor 26 to open the valve 21.

As previously discussed, thumbwheel 27 is coupled to the shaft 57 for manual positioning thereof. The rotation of shaft 57 with the motor coupling held fixed results in the linear position of shaft 57, in accordance with a conventional rotary-to-linear coupler mechanism. The accurate positioning of the valve unit by wheel 27 is thus dependent on the non-rotational movement of the motor coupled element. To establish a positive lock, the motor 26 is dynamically breaked by appropriate energizing of the winding to lock the motor rotor in place, and in the illustrated motor embodiment by simultaneously energizing a plurality of winding, as follows: Referring particularly to motor circuit board 66 (FIG. 4a), a normally open switch 180 is shown connected in circuit between a pair of pins 181 and 181a of source 83 and a negative supply connection cable 79a for selectively applying and removing of the negative supply to the one terminal pin 181. Switch 180 is a small micro switch which operates momentarily to pulse terminal 181. Switch 180 is mounted within the housing 25 and is actuated by cover 39 as shown in FIG. 4A. With the cover 39 removed to expose the thumbwheel 27, the switch 180 is actuated to pulse terminal pin 181 and the motor is dynamically locked in place. With the cover 39 in place, the switch 180 is closed, and the source 83 is conditioned to reversibly drive the motor 26, either through the programmed controller 6 or the operation of the manual control lever 33.

In the manual thumbwheel control mode, the system is also set to prevent signalling of the motor to operate by a signal at pin 84. Referring to FIGS. 3 and 4a, a second switch 182 is shown coupled to cover 39 and actuated via the same cover operator switch 180. Switch 182 is connected in series with the connection to pin 84. The switch 182 is a normally open switch and is series connected between pin 84 and the input signal pin 85 of connector 72b on board 66. With the cover 39 removed switch 182 is open. With the cover in place the switch 182 is closed and enables the circuit connection to the drive terminal pin 84 for the previously described automatic programmed control or alternately the manual control provided by lever 33.

In addition, a set point monitor is incorporated into the valve positioning control system and provides a continuous indication of the positioning of the valve unit in a selected set point valve position. In the illustrated embodiment of the invention with particular reference to FIGS. 2-4b, a set point lamp 184 is mounted on the panel 30.

The lamp 184 is preferably a dual color filament lamp to establish a different color display depending upon the polarization of the power impressed on the lamp. Thus, the lamp 184 includes a pair of L.E.D. display elements 185 and 185a connected in parallel and in opposite polarization to a D.C. supply. The one diode 185 of the lamp 184 is adapted to establish a green display in response to a first polarized supply and the other diode 185a establishes a red display in response to an alternate opposite polarized supply, thereby providing clear indication to the operator that the system is or is not at set point. A double pole, double throw relay 186 has movable contacts 186a connected to the low voltage supply and to ground, respectively. The contacts selectively engage first fixed contacts 186b connected to supply first polarized power to the parallel diodes 185 and 185a and second fixed contacts 186c to reverse the polarized power.

The lamp relay winding 187 is connected in circuit to the output of the comparator amplifiers 109 and 110, which respectively generate an open valve signal and a close valve signal. With the valve and flow at the set point, the output of the amplifiers 109 and 110 will be low or effectively off. In actual practice, the system is established to provide a zero output if the signal differential is two percent or less of the set point.

The outputs of amplifiers 109 and 110 are connected through isolating diodes 188 and 188a to a set point status line 189. If either of the amplifiers establishes a drive output signal, a related signal is established through the related diode at the status signal line 189. A relay unit 190 includes contacts 190a in the status line to disable the circuit under manual control. Thus, the relay winding 190b of unit 190 is grounded via a connection to the input terminal 163a to the manual relay 134. This is necessary as under manual control the set point is directly set by the operator.

A time delay unit 191, such as a suitable electronic timer, is connected in the status line downstream of the relay contacts 189. The time delay circuit delays the transmission of the status signal for a selected period within which the valve unit should be driven to the demanded set point in response to any deviation between the program demand signal and the flow rate signal. Typically, in a flow meter for monitoring flow in industrial furnace applications, a five second period has been selected for appropriate readjustment of the valve unit to establish set point flow. The time delay unit 191 therefore begins timing upon establishment of a drive signal for the valve in one direction or the other. If the set point is established within that five second period, the drive signal will turn off and the time delay circuit will reset.

If however, the set point is not reached within the five second period, the time delay unit times out and transfers the status signal via the status line 189 to switch the lamp 184 from set point display color to the alarm color.

More particularly, the time delay circuit 191 includes a resistive-capacitor timing network 192 connected to the low voltage supply. A transistor 193 is connected to the input of network 192 and is normally conducting to hold the network in standby. A transistor 194 has its input connected to the status signal line 189 and its output connected to turn transistor 193 off in response to the signal from the status line 189, thereby initiating a timing cycle.

The output of the timing network 191 is connected through a transistorized driving circuit 195 to turn on a transistor 196 connected to the ground side of the relay winding 187 and thereby energize the set point relay 186. Thus, whenever, the timing network 191 times out, the relay contacts 186a move to de-energize the "green" diode 185 and energize the "red" diode 185a. If the lamp 184 is red, indicating a failure of set point, the operator immediately knows that the valve system has not been appropriately adjusted due to some failure within the sensing or control circuitry. The operator can immediately provide necessary attention to the system to make any necessary correction. For example, in a float operated flow meter such as that disclosed, dirt or other foreign matter entering into the float structure may bind the float 14. The float 14 is then stuck in a given position and may provide an erroneous output signal to the control unit. The control may thus be signalled to drive the valve open or closed depending upon the differential and the motor 26 will continue to drive the valve unit without effectively changing the readout. With the described monitor, the continued drive of the motor 26 without reaching the set point within the allotted time will immediately alert the operator to the malfunctioning of the system. The operator can then place it in a manual position to appropriately set the unit and in so doing will be able to locate the particular described malfunction.

The motorized program control system can be replaced with a simple manual control valve actuator 197 in place of the motor and its coupling shaft. In a preferred construction as shown in FIG. 5, the manual control actuator 197 is specially formed with a manually positioned threaded shaft 198 having a coupling end 199 machined to correspond to the diameter of the motor shaft 57 for direct substitution of the manual rotary control for the motor driven control. The identical valve stem units 50 can then be directly used with the manual or the motorized control.

More particularly, the manual control actuator 197 includes a mounting cap 200 adapted to be secured to the upper end of the valve body or cage 40 as a direct replacement for the motorized valve unit and its housing. The threaded shaft member 198 is threaded through a threaded body 201 of cup 200 and rotation of the shaft results in a linear motion of the shaft. The shaft 198 projects upwardly from the body with a knurled control knob 202 secured to the shaft. The extension 199 of the shaft 198, as previously noted, is a machined end for direct coupling to the stem body 51 through the releasable set screw 57a, corresponding to the interconnection of the motor shaft to the valve stem, as shown in FIG. 3. Rotating the knob of 202 establishes linear position of the shaft 198 and the valve stem 52.

Various modes of carrying out the invention are contemplated as being within the scope of the following claims particularly pointing out and distinctly claiming the subject matter which is regarded as the invention.

We claim:

1. A valved flowmeter apparatus comprising a flowmeter including a flow passageway having an inlet connector and an outlet connector at the opposite ends of said flow passageway for flow of a fluid, said flowmeter including a flow driven element within said passageway indicating the flow through said passageway, a valve body mounted to said flowmeter and including an inner round orifice mounted within said passageway between said connectors whereby flow is through said orifice, said orifice defining a flow opening between an inlet edge and an outlet edge adjacent said outlet connector, said valve body having an elongated bore with a common axis with said orifice, a valve unit slidably disposed within said bore and having an elongated valve stem projecting through said orifice and movable on an axis coincident with the axis of said orifice to vary the size of the flow opening between said outlet edge and said stem in accordance with the position of said stem within said orifice, said valve stem being round and having a diameter slightly less than said orifice and having a slightly tapered portion, said slightly tapered portion at least substantially equal in length to the axial length of said orifice and of a diameter slightly less than the diameter of said outlet edge of said orifice and defining a progressively reduced stem diameter passing through the orifice, and a drive unit secured to said valve unit for linearly moving said valve stem through said orifice with said tapered portion passing substantially completely through said orifice to establish a minimum edge opening between said outlet edge and said stem at a minimum flow rate and selectively positioning said stem within said orifice for increasing said edge opening and thereby controlling the rate of flow through said orifice and thereby through said flowmeter.

2. The valved flowmeter apparatus of claim 1 including a flow sensor coupled to said passageway and creating an output signal in accordance with the flow rate, and a programmed control unit including a first input coupled to a selected flow rate demand signal and a second input coupled to said flow sensor for operating said drive unit to vary the position of said valve stem in accordance with the difference in said demand signal and said output signal to increase and decrease the flow in said passageway to maintain the output of said sensor at a value related to said demand signal and thereby maintain said selected flow rate.

3. The valved flowmeter apparatus of claim 1 wherein said flow opening of said orifice includes a constant diameter and said outlet edge being a sharp edge adjacent the outlet connector and said flow opening extending inwardly from said sharp edge.

4. The apparatus of claim 1 wherein said orifice includes a progressively enlarged diameter from an outer sharp edge and extending inwardly toward the flow passageway from said edge.

5. The valved flowmeter apparatus of claim 1 wherein said valve body includes a releasable connection unit with said flowmeter, and thereby adapting said apparatus for connecting different valve bodies substantially corresponding to said valve body and each having an identical releasable connection unit corresponding to said releasable connection and each said plurality of valve bodies having a different diameter orifice than said first named valve body for varying the orifice opening in accordance with a selected different flow range.

6. The apparatus of claim 1 wherein said drive unit includes a drive motor unit having a linearly moving output shaft extending inwardly from said motor through said bore, a connecting unit connecting said shaft to said valve stem and establishing a substantially rigid connection therebetween, and said connecting unit including a release element permitting separation of said shaft and said valve stem.

7. The apparatus of claim 6 including a plurality of valve stems each having a different angle of taper.

8. The valved flowmeter apparatus of claim 6 wherein said shaft includes an outer free end extending outwardly from said motor opposite said valve stem for manual positioning of said shaft and valve stem.

9. The flowmeter valved apparatus of claim 6, wherein said motor unit includes a stepping motor, said stepping motor being adapted to produce movement of said shaft and interconnected valve stem unit during each step.

10. The apparatus of claim 9 wherein said motor moves the valve stem about one thousandth of an inch for each step.

11. In the apparatus of claim 6, wherein said valve stem unit includes an outer cylindrical stem body connected to said stem, said cylindrical stem body having an annular recess located within said bore, a U-shaped cup seal located within said recess and opening axially toward said valve stem to establish a frictional seal between said stem body and said bore of said valve body, said seal establishing a liquid tight seal with minimal sliding frictional loading.

12. The apparatus of claim 8 including an adjustable wheel secured to the outer free end of said shaft for said manual positioning of the valve stem.

13. The apparatus of claim 12 including an enclosure mounted to said valve unit and enclosing said motor and said wheel, said motor having rotary output and a rotary to linear coupling to said shaft whereby with said motor off rotation of said shaft creates linear movement of the shaft, said enclosure having a releasable access wall, an interlock plate projecting inwardly in a plane passing through the axis of said shaft, said wheel having a radial slot extending parallel to the shaft axis, said slot complementing and engaging said interlock plate with said access wall in place whereby said wheel and shaft is held against rotation while permitting axial movement of said shaft in response to operation of said stepping motor.

14. The apparatus of claim 13 wherein said stepping motor is coupled to move said shaft about one thousandth of an inch for each step movement of said motor, and including a pulse source coupled to actuate said motor and having a pulse rate of about two pulses per second.

15. The apparatus of claim 13 wherein said stepping motor is provided with first and second windings, and having means to simultaneously energize said windings to dynamically brake said motor.

16. The apparatus of claim 13 having a pulse source connected to said motor and having first and second pulse rate control means to establish a first pulse rate and a second pulse rate.

17. The apparatus of claim 9 wherein said stepping motor is a low voltage direct current stepping motor, said control unit having a corresponding low voltage direct current supply demand, and a 24 volt DC supply being supplied to said control unit for operation of said stepping motor and the interrelated control unit.

18. A motorized flowmeter and valve apparatus, comprising a flowmeter housing including an elongated flow passageway having an inlet opening at one end and a discharge opening at the opposite end, a valve seat located within said discharge opening and having a circular valve orifice, said orifice having a substantially constant diameter elongated sidewall with a sharp discharge edge defining a valve seat at the discharge end of the valve orifice and having a spaced inlet edge, a control valve stem mounted to said housing at the discharge opening of said passageway and movable inwardly through said sharp edge and said valve orifice and terminating in an outer free with the outer free end of the valve stem located in spaced relation from said inlet edge of said orifice, said valve stem having a longitudinal slight taper from a circular diameter at least equal to the diameter of said sharp edge opening and progressively decreasing in diameter toward the outer free end of stem to define a restrictive flow passageway varying slightly between said sidewall of the orifice and the stem and thereby between said discharge edge and said stem, a stem positioning unit coupled to said stem for moving said stem along the axis of said orifice for selectively varying the passageway between the valve stem and said valve orifice and particularly said sharp edge, and a drive motor unit coupled to said stem positioning unit and operable to reversibly position said valve stem for automated control of said valve opening.

19. The apparatus of claim 18, including means to limit the closing force applied to said valve stem and thereby preventing damage to said valve seat.

20. The apparatus of claim 18, wherein said drive unit includes a reversible rotary motor having a rotary-to-linear motion converter and having a linearly moving shaft member coupled to said stem positioning unit.

21. The apparatus of claim 20, wherein said shaft member projects outwardly from said motor unit, to an outer portion means coupled to said outer portion for manually positioning of said positioning member, with said motor non-rotating.

22. The apparatus of claim 21, wherein said motor includes a dynamic breaking input, and means to selectively energize said dynamic breaking input and thereby locking said motor against rotation for permitting manual positioning of said valve unit.

23. The apparatus of claim 18, having a control circuit for energizing of said motor unit, a command unit to establish a signal proportional to a commanded valve stem position, said control circuit including a first automatic mode interconnecting said motor to said command unit for automated positioning of said valve stem and including a manual mode wherein said motor is operatively disconnected from command unit, said control circuit having a manual switch control unit for selectively supplying power to said motor for forward and reverse rotation of said motor.

24. The valved flowmeter apparatus of claim 1 including a releasable mounting unit connecting said drive unit to said valve unit for linearly moving said valve stem, said drive unit including a linear moving drive shaft member for connection to said valve unit and a mounting body for releasable connection to said valve unit, said drive unit including a motor driven unit connected to said shaft member and having a manually operable unit connected to said shaft member, a flow sensor unit coupled to said passageway and establishing a flow-relative sensed signals, and a programmed control unit including a first input coupled to a selected flow rate demand signal and second input coupled to said flow sensor for driving said motor driven unit to vary the position of said valve stem to increase and decrease the flow in said passageway and to maintain the output of said sensor at a value related to said demand signal and thereby maintain said selected flow rate, and a manual control unit for separately actuating said motor driven unit and setting said valve unit.

25. The apparatus of claim 24 wherein said valve unit includes a valve seat operable over a range of flow, a plurality of valve stems each having a constant taper and a taper differing from said valve stem and each differing from the other valve stems of said plurality of valve stems.

26. The flowmeter valved apparatus of claim 24 wherein said motor driven unit includes a stepping motor, said stepping motor being adapted to produce movement of said motor driven member and interconnected valve stem unit during each step, an adjustable wheel secured to the outer end of said shaft member for manual positioning of the valve stem unit, an enclosure mounted to said valve unit and enclosing said motor and said wheel, said motor having rotary output and a rotary-to-linear coupling to said shaft whereby with said motor off rotation of said motor-driven shaft creates linear shaft movement, said enclosure having a releasable access wall, an interlock plate projecting inwardly in a plane passing through the axis of said shaft, said wheel having a radial slot extending parallel to the shaft axis, said slot complementing and engaging said interlock plate with said access wall in place whereby said wheel and said shaft is held against rotation while permitting axial movement of said shaft in response to operation of said stepping motor, said stepping motor is provided with a first and second windings, and brake means to simultaneously energize said windings to dynamically brake said motor, means responsive to release of said access wall to operate said brake means, a pulse source connected to said motor and having first and second pulse rate control means to establish a first pulse rate and a second pulse rate, speed limit means to prevent operating said motor at said high speed, and means to actuate said speed limit means.

27. The apparatus of claim 26 having a manual/programmed switch unit for selectively connecting said motor for operation in response to said programmed control unit and alternatively for operation in response to said manual control unit, a status sensing system operable for selectively connecting said stepping motor from said programmed control unit to said manual control unit in response to selected states of said programmed control, said sensing system being responsive to selected limit outputs of said flow sensor unit.

28. The apparatus of claim 27 wherein said manual control unit includes a control switch unit having a control lever including a first switch position for energizing of the stepping motor for rotation in a first direction and a second switch position for energizing of said stepping motor for rotation in an opposite direction, and an off position, said control lever being biased to said off position g and having a manual control display and a programmed control display responsive to corresponding positioning of said manual/programmed selection switch, said programmed control unit being responsive to loss of signal from said flow sensor to simultaneously energize said programmed/display unit and periodically energize said manual display unit thereby defining said state of said programmed control unit.

* * * * *